UNITED STATES PATENT OFFICE.

CARL RACH, OF STAPLETON, NEW YORK.

PROCESS OF MAKING BEER.

1,163,453. Specification of Letters Patent. Patented Dec. 7, 1915.

No Drawing. Application filed October 11, 1911. Serial No. 654,012.

*To all whom it may concern:*

Be it known that I, CARL RACH, a subject of the King of Prussia, and residing at Stapleton, in the county of Richmond and State of New York, have invented a new and useful Process of Making Beer, of which the following is a specification.

My invention relates to the manufacture of beer, and the object of my invention is to provide a process by which the percentage of alcohol therein may be accurately controlled and by which the extraction of the material of the mash may be more completely effected than is now the case.

The percentage of alcohol in beer depends as is well understood, upon the proportion of sugar present in the wort during fermentation. Ordinary beer wort contains about 8% malt sugar, which yields about 4% alcohol by fermentation. This percentage may be reduced practically by half according to my present process which in brief consists in preparing the beer wort from separate mashes, in one of which the diastasic action is permitted to be completed so that the wort may be drained through the usual filter-tub false bottom, while the other mash is so controlled that the diastasic action of the malt is interrupted at once as soon as it has split the starch of the malt or raw grain into malt sugar and dextrin and before the dextrin has been appreciably converted by continued diastasic action into malt sugar. Such a mash is however too dense to pass readily through the false bottom of a filter-tub and I therefore pass the same through a filter press to the hop kettle into which the wort from the filter-tub is also drained. This combined wort thus comprises one portion which contains a normal amount of maltose or malt sugar and a second portion which has only about one quarter the usual maltose content, with the result that the percentage of maltose in the combined wort is far below the usual content and consequently the percentage of alcohol in the final fermentation product is materially lowered.

The following is an example of my process: For instance making 300 barrels of beer, I take as an average 50 lbs. of material per barrel, which would mean 15,000 lbs. of material altogether. These 15,000 lbs. I divide into 9,000 lbs. of malt which for the most part will preferably be barley malt and 6,000 lbs. of unmalted cereals which preferably will be corn meal or corn grits or rice, (coarsely broken rice or rice flour). The 6,000 lbs. of unmalted cereals I divide into two portions of 3,000 lbs. each and the 9,000 lbs. of malt I also divide into three portions, one portion of 7,000 lbs., and two further of 1,000 lbs. each. The 7,000 lbs. of malt I mash in the mash-tub at 95° F., using for each 100 lbs. of malt one barrel of water. The first 3,000 lbs. of raw grain I mash together with 1,000 lbs. of malt at a temperature of 120° F. which mash I bring slowly to the boiling point and boil for three-quarters of an hour. This mash I mix with malt mash and bring the temperature of the two mashes to 165° F., I leave the mash at this temperature at rest for forty minutes and then draw off the wort, sparge freely and draw off the after worts, collect them in the beer kettle and then I begin boiling same. The wort so obtained is more dilute than the regular wort since an excess of sparging water has been employed. Now I take the second 3,000 lbs. of raw grain and mix them with 700 lbs. of malt and mash this mixture with one-half barrel of water for each 100 lbs. of material at a temperature of 180° F., I raise the temperature slowly to the boiling point 212° F. and boil for three-quarters of an hour. After this I cool off the mash with cold water to 168° F. and add the remaining 300 lbs. of finely ground malt, bringing the temperature of the mash to 165° F. This malt will convert all the starch of the mash and as soon as the erythrodextrin reaction has ceased to appear (which will be determined from samples taken from the mash), I raise the temperature of this mash to 200° F. to end the diastasic action and transfer it to a filterpress from which I run the wort into the boiling wort in the beer kettle. Here the combined worts are boiled with hops in the usual manner and subsequently the hopped wort is cooled, fermented and finally ripened in any suitable manner.

Through the above described regulation of the second mash I control the chemical composition of the wort, especially as regards the proportions of sugar to non-sugar in the wort, in a manner not hitherto practised. Furthermore, inasmuch as the filter-press can handle a much denser mash than can be successfully treated in a mash-filter tub, it is possible to decrease the percentage of water in the second mash, thus permitting the use of a much greater quantity of sparging water for the first mash and consequently more thoroughly extracting the material of this mash.

While I have spoken of a first and second mash, it will be understood that these are preferably made simultaneously, and combined in the hop kettle as soon as ready.

The proportions stated are given only by way of example and may be varied to effect the desired result. Similarly the extent to which the diastasic action is permitted to proceed in the second mash will vary with the style of beer or ale which it is desired to make.

It will be noted that the temperature of the first mash is maintained sufficiently low to insure the action of the diastase upon the unconverted starch of the malt (which is here present in relatively large quantity) both during the main mashing process and during the sparging of the mash which washes out the unconverted starch at the point of the malt grain. It will be further noted that the percentage of malt in the second mash is quite low and that it is finely ground, while the raw grain is cooked and thus brought to gelatinous condition before the malt is added. The diastasic action in this mash is thus rapid and even so that little or no unconverted starch remains to render the wort turbid and cloudy.

I claim as my invention:—

1. In the process of making beer, the formation of a beer wort from a plurality of mashes, in one of which a low proportion of malt is employed and a disproportionally small quantity of liquid, and passing said mash through a filter-press to secure a concentrated wort, the other mash comprising a large proportion of malt, from which the wort is drained off, said mash being then sparged with a disproportionally large quantity of water to obtain from this mash a weak wort, said weak and concentrated worts being combined, and then boiled with hops, fermented and ripened, in the usual manner.

2. In the process of making beer, the formation of a beer wort from a plurality of simultaneously prepared mashes, in one of which a low proportion of malt is employed and a disproportionally small quantity of liquid, and passing said mash through a filter-press to secure a concentrated wort, the other mash comprising a large proportion of malt, from which the wort is drained off, said mash being then sparged with a disproportionally large quantity of water to obtain from this mash a weak wort, said weak and concentrated worts being combined, and then boiled with hops, fermented and ripened, in the usual manner.

3. In the process of making beer, the formation of a beer wort from a plurality of simultaneously prepared mashes, one of said mashes comprising a disproportionally small quantity of water and cereals in which the percentage of malt does not exceed 40 per cent. of the cereals used for this mash, and passing said thick mash through a filter press whereby a concentrated wort is secured, the other mash, comprising a relatively large quantity of water and cereals in which the malt represents at least 50 per cent. of the cereals employed, drawing off the wort from this second mash, and sparging the mash with a large quantity of water to thoroughly extract the cereals, whereby a weak wort is obtained from said second mash, the worts from the two mashes being combined, boiled with hops, fermented and ripened, substantially as described.

4. In the process of making beer, the novel method of preparing a wort for the beer kettle, which comprises, mashing a quantity of raw grain and malt in which the percentage of malt largely exceeds that of the grain with an abnormally large quantity of water, and in which mash the diastasic action of the malt is permitted to proceed until the normal quantity of maltose for the mash is produced, draining the wort and spargings from the mash tub to the hop kettle, mashing a second quantity of raw grain and malt, in which the percentage of raw grain largely exceeds the malt and an abnormally low percentage of liquid is employed, halting the diastasic action before a substantial quantity of maltose is produced, pressing the wort from the mash in a filter press, and combining this wort with that drained from the first mentioned mash, in the beer kettle, whereby the materials of both mashes are thoroughly extracted and a wort having a low percentage of fermentable matter is produced, substantially as described.

In testimony whereof I have signed my name to this specification, in the presence of two subscribing witnesses.

CARL RACH.

Witnesses:
 WALTER ABBE,
 M. E. KEIR.